(12) United States Patent
Gattu et al.

(10) Patent No.: US 12,460,655 B2
(45) Date of Patent: Nov. 4, 2025

(54) HELICAL SEAL FOR MULTI-STAGE COMPRESSOR

(71) Applicant: Honeywell International Inc., Charlotte, NC (US)

(72) Inventors: Raghavendra Gattu, Bangalore (IN); Bharath Chandra G, Bangalore (IN); Chandiran Jayamurugan, Bangalore (IN); Niall McCabe, Torrance, CA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/670,028

(22) Filed: May 21, 2024

(65) Prior Publication Data

US 2025/0283476 A1    Sep. 11, 2025

(30) Foreign Application Priority Data

Mar. 11, 2024   (IN) .............................. 202411017346

(51) Int. Cl.
*F04D 29/12* (2006.01)
*F04D 17/12* (2006.01)

(52) U.S. Cl.
CPC ......... *F04D 29/124* (2013.01); *F04D 17/122* (2013.01)

(58) Field of Classification Search
CPC ...... F04D 29/10; F04D 29/102; F04D 29/104; F04D 29/122; F04D 29/124; F04D 17/122; F05D 2240/55; F05D 2240/60; F05D 2250/25
See application file for complete search history.

(56) References Cited

U.S. PATENT DOCUMENTS

| | | | | |
|---|---|---|---|---|
| 450,004 A | * | 4/1891 | Daley | F16J 15/406 415/168.3 |
| 2,487,177 A | * | 11/1949 | Pollock | F16C 33/74 415/168.3 |
| 3,131,940 A | * | 5/1964 | Ertaud | F04D 29/10 277/587 |
| 3,131,942 A | * | 5/1964 | Ertaud | F16J 15/406 415/168.3 |
| 3,355,179 A | * | 11/1967 | Mcgrew, Jr. | F16J 15/406 277/430 |

(Continued)

FOREIGN PATENT DOCUMENTS

| | | |
|---|---|---|
| CN | 104929699 A | 9/2015 |
| CN | 104929700 A | 9/2015 |

(Continued)

OTHER PUBLICATIONS

Extended Search Report from counterpart European Application No. 25158117.9 dated Jul. 29, 2025, 9 pp.

*Primary Examiner* — Brian P Wolcott
(74) *Attorney, Agent, or Firm* — Shumaker & Sieffert, P.A.

(57) ABSTRACT

A compressor comprising: an drive shaft; a first compressor wheel; a second compressor wheel connected to the first compressor wheel via the drive shaft; and two or more helical seals disposed on the drive shaft, each helical seal of the two or more helical seals extending away from an outer surface of the drive shaft and around a circumference of the drive shaft, wherein the two or more helical seals are configured to inhibit flow of fluid between the first compressor wheel and the second compressor wheel.

20 Claims, 6 Drawing Sheets

(56) References Cited

U.S. PATENT DOCUMENTS

| | | | | |
|---|---|---|---|---|
| 3,622,164 | A * | 11/1971 | Herbert | F16J 15/406 |
| | | | | 415/230 |
| 4,471,963 | A * | 9/1984 | Airhart | F16J 15/403 |
| | | | | 277/930 |
| 6,368,077 | B1 * | 4/2002 | Meyerkord | F02C 7/06 |
| | | | | 417/407 |
| 8,066,475 | B2 | 11/2011 | Bulgrin et al. | |
| 9,695,704 | B2 | 7/2017 | Rizzo et al. | |
| 10,247,192 | B2 | 4/2019 | Brillet et al. | |
| 10,400,787 | B2 * | 9/2019 | Bertoneri | F04D 17/10 |
| 10,480,339 | B2 * | 11/2019 | Kim | F01D 11/02 |
| 11,209,009 | B2 * | 12/2021 | Masuda | F04D 29/0516 |
| 2015/0086343 | A1 | 3/2015 | Rizzo et al. | |
| 2017/0254341 | A1 | 9/2017 | Bertoneri et al. | |

FOREIGN PATENT DOCUMENTS

| | | | | |
|---|---|---|---|---|
| CN | 108180160 A * | 6/2018 | | |
| CN | 113790173 A * | 12/2021 | | |
| JP | 2008202585 A * | 9/2008 | | |
| WO | WO-0109497 A1 * | 2/2001 | | F01D 11/02 |
| WO | WO-0216740 A1 * | 2/2002 | | F01D 11/02 |
| WO | 2014096708 A1 | 6/2014 | | |

\* cited by examiner

HELICAL SEAL FOR MULTI-STAGE COMPRESSOR

This application claims the benefit of Indian Provisional Patent Application No. 202411017346, filed Mar. 11, 2024 and entitled "HELICAL SEAL FOR MULTI-STAGE COMPRESSOR," the entire contents of which is incorporated herein by reference.

TECHNICAL FIELD

The present disclosure relates to systems and techniques for producing conditioned air for a vehicle, and more particularly, to compressor systems and techniques for producing compressed vapor refrigerant.

BACKGROUND

A vapor cycle system may cool a fresh air stream using a refrigerant. The vapor cooling system compresses and condenses the refrigerant from a relatively low-pressure vapor to a relatively high-pressure liquid, which then expands and evaporates to remove heat from the fresh air stream.

SUMMARY

A vapor cycle system (VCS) may monitor and control the temperatures of systems and/or components within a vehicle. VCS may include one or more centrifugal compressors which compresses and condenses a refrigerant flowing within the VCS from a relative-low pressure vapor to a relatively high-pressure fluid. In some examples, a compressor system of a VCS may include multiple centrifugal compressors coupled in series to cause the compressor system to output the refrigerant at a specific pressure ratio (e.g., a ratio of the pressure of the refrigerant at an output of the compressor system to the pressure of the refrigerant at an input of the compressor system. When multiple compressors are coupled in series, each compressor may receive the refrigerant from an outlet of a preceding compressor in the series and output the refrigerant directly into a succeeding compressor in the series via an outlet of the compressor.

Compressor systems may multiple compressors coupled in series and connected via an drive shaft extending through each compressor. In other compressor systems, there may be unintended transfer of refrigerant between compressors, e.g., along a channel within the compressor system configured to retain the drive shaft. The example compressor systems described herein include a plurality of helical seals disposed on the drive shaft at a plurality of locations along the drive shaft. The helical seals may inhibit the flow of refrigerant through the channel and between longitudinally adjacent compressors.

The example compressor system with multiple helical seals may provide several advantages over other compressor systems with multiple compressors or compressor wheels coupled in series. The example helical seals described herein may facilitate the redirection of refrigerant within the channel and inhibit the flow of refrigerant past each helical seal and towards another compressor. In some examples, the example helical seals may be wound in different directions, which may facilitate re-direction of proximal and distal flow of refrigerant out of the channel, which may inhibit or reduce the unintended flow of refrigerant from a distal compressor into a proximal compressor, and vice versa. The example helical seals may provide increased efficiency, simplicity, and modularity compared to other seals (e.g., carbon seals) disposed within other compressor systems with multiple compressors. The example helical seals may facilitate balancing of the drive shaft within the channel while inhibiting the unintended flow of refrigerant.

In some examples, the disclosure is directed to a compressor comprising: an drive shaft; a first compressor wheel; a second compressor wheel connected to the first compressor wheel via the drive shaft; and two or more helical seals disposed on the drive shaft, each helical seal of the two or more helical seals extending away from an outer surface of the drive shaft and around a circumference of the drive shaft, wherein the two or more helical seals are configured to inhibit flow of fluid between the first compressor wheel and the second compressor wheel.

In some examples, the disclosure is directed to a compressor system comprising: a compressor comprising: a first compressor wheel; a second compressor wheel; an drive shaft extending along a longitudinal axis from a proximal end to a distal end, wherein the drive shaft extends through the first compressor wheel and the second compressor wheel and connects the first compressor wheel to the second compressor wheel, and wherein the distal end of the drive shaft is distal to the first compressor wheel; and two or more helical seals disposed on the drive shaft, each helical seal of the two or more helical seals extending away from an outer surface of the drive shaft and around a circumference of the drive shaft; a housing configured to retain the compressor, the housing comprising: a channel extending along the longitudinal axis and configured to retain the drive shaft, wherein the two or more helical seals are configured to inhibit flow of fluid between the first compressor wheel and the second compressor wheel through the channel; and a motor coupled to the proximal end of the drive shaft and configured to apply a rotary force on the drive shaft.

In some examples, the disclosure is directed to a method comprising: position a first compressor wheel of a compressor within a housing; connecting a second compressor wheel of the compressor to the first compressor wheel by at least partially inserting an outer shaft of an drive shaft of the compressor into the first compressor wheel, wherein the outer shaft is connected to the second compressor wheel, and wherein the outer shaft of the drive shaft comprises: two or more helical seals disposed on the outer shaft, each helical seal of the two or more helical seals extending away from an outer surface of the outer shaft and around a circumference of the outer shaft; inserting an inner shaft of the drive shaft through an inner lumen of the outer shaft along a longitudinal axis of the compressor; and affixing the inner shaft to the first compressor wheel and the second compressor wheel.

The details of one or more examples are set forth in the accompanying drawings and the description below. Other features, objects, and advantages will be apparent from the description and drawings, and from the claims.

BRIEF DESCRIPTION OF THE FIGURES

The details of one or more examples are set forth in the accompanying drawings and the description below. Other features, objects, and advantages will be apparent from the description and drawings, and from the claims.

Like reference characters refer to like elements throughout the figures and description.

DETAILED DESCRIPTION

Various examples discussed herein describe vapor cooling systems, vapor compression systems, centrifugal compressors, centrifugal compressor systems, and centrifugal compressor components that include two or more compressor wheels coupled in series and in a nested configuration.

A centrifugal compressor system is configured to drive one or more impellers of one or more compressor wheels using a compressor motor to compress a vapor refrigerant to a higher pressure. Compressor wheels may be coupled in series to increase a pressure ratio generated by the compressor system. In such examples, a first compressor wheel may compress a refrigerant and may output the refrigerant directly into a second compressor wheel. The second compressor wheel may then further compress the refrigerant, thereby increasing the pressure ratio of the refrigerant. Multiple impellers of multiple compressor wheels coupled in series may be driven by a same compressor motor.

In some examples, a centrifugal compressor system with multiple compressor wheels coupled in series may position multiple compressor wheels along a longitudinal axis. For example, a first-stage compressor wheel may be distal to a second-stage compressor wheel. Each compressor wheel may be connected (e.g., to a motor) via an drive shaft extending through the compressor wheels. In such examples, the first-stage compressor wheel may be affixed to a distal end or distal portion of the drive shaft and the second-stage compressor wheel may be affixed to the drive shaft at a position proximal to the first-stage compressor wheel. Each compressor wheel may be separated from one or more other compressor wheels via the housing of the compressor system, e.g., such that refrigerant is configured to be directed from outlet of one compressor wheel to an inlet of another compressor wheel via one or more pathways defined by the housing.

In some multi-stage compressor systems, refrigerant may flow along a channel in the housing configured to retain the drive shaft. In some examples, the refrigerant may flow along the channel and past one or more compressor wheels (e.g., past the first-stage compressor wheel and directly into the second-stage compressor wheel). In some examples, the refrigerant may flow from a compressor wheel directly towards an inlet or outlet of the compressor system (e.g., from second-state compressor wheel and towards an inlet of the first-stage compressor wheel).

The disclosure describes a compressor system with two or more compressor wheels connected in series via an drive shaft. The compressor system may include two or more helical seals disposed on the drive shaft (e.g., directly on an outer surface of the drive shaft, on an outer surface of an outer casing configured to be secured to the drive shaft). The two or more helical seals may be configured to inhibit flow of refrigerant through the channel containing the drive shaft. Each helical seal may be wound in a different direction than another helical seal. The helical seals may be wound in specific directions to redirect the flow of refrigerant through the channel, e.g., back towards an entrance to the channel through which the refrigerant enters the channel.

The compressor system described herein may provide advantages over other compressor systems. The compressor system described here may include helical seals which provide improved sealing of the channel around the drive shaft without impeding the rotation of the drive shaft within the channel. The helical seals may be integrated into the drive shaft and/or an outer casing of the drive shaft, which may simplify maintenance and replacement of the helical seals (e.g., via simple replacement of the drive shaft and/or one or more compressor wheels) compared to other seals (e.g., carbon seals). The helical seals may provide improved abilities to redirect the flow of refrigerant within the channel, which may further improve the sealing capabilities of the helical seals. The compressor system described herein may be less complex and less costly to manufacture than other compressor systems due to the reduced complexity of the housing of the compressor system and/or the reduced complexity of the arrangement of the compressor wheels.

Vapor cooling systems, compressors, compressor systems, and compressor components discussed herein may be used to produce conditioned air for a variety of applications. In some examples, vapor cooling systems discussed herein may be used to cool pressurized air, such as for a pressurized cabin or avionics systems of an aircraft. In some examples, vapor cooling systems, including vapor-cooled compression systems, may be used, for aircraft and non-aircraft implementations, to cool liquid, non-pressurized air, etc., in accordance with one or more of the various techniques of this disclosure. In another example, vapor cooling systems, including vapor-cooled compression systems, may be used, for aircraft and non-aircraft implementations, to cool equipment, such as through direct contact-cooling of equipment.

Figure 1:
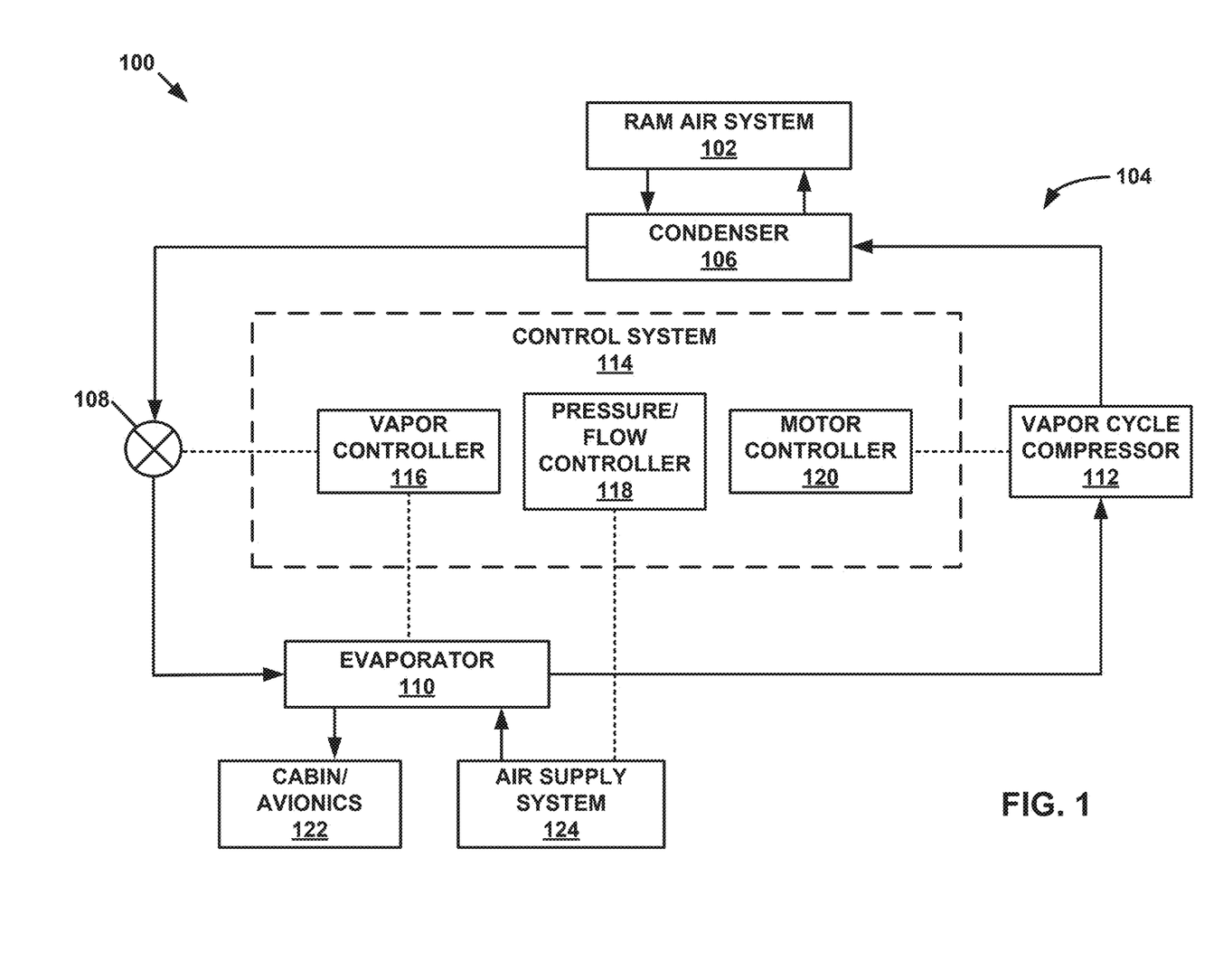
FIG. 1 is a block diagram illustrating a system for generating conditioned air that includes an example vapor cooling system (VCS).

FIG. 1 is a block diagram illustrating an example system 100 for generating conditioned air that includes a vapor cooling system (VCS) 104. The conditioned air may be used to cool volumes or components of various cabins or avionics systems 122. Cabin/avionics 122 may be a compartment of a vehicle (e.g., an aircraft, an automobile, a spacecraft, a watercraft, etc.) that includes an internal environment and/or one or more avionics systems that receive cooled air for cooling equipment. For example, cabin/avionics 122 may be configured to house people, cargo, and the like, in the internal environment. It will be understood that avionics generally relate to aircraft, spacecraft, etc., and that other systems may include other electronic systems/control systems configured for cooling. Thus, while described as cabin/avionics 122, the techniques of this disclosure are not so limited, and a person skilled in the art will understand that the systems described herein may be employed in a variety of contexts without significantly departing from structures and mechanics described herein.

VCS 104 includes a vapor cycle compressor (VCC) 112, a condenser 106, an expansion device 108 (e.g., an expansion valve), and an evaporator 110 fluidically coupled to each other through pressurized refrigerant supply lines to form a refrigerant circuit. A variety of refrigerants may be used in VCS 104, as will be explained further below.

VCC 112 may be configured to receive vapor refrigerant from evaporator 110 and compress and pump vapor refrigerant to condenser 106. VCC 112 may include a centrifugal compressor system configured to receive the vapor refrigerant at an inlet pressure and discharge the vapor refrigerant at a higher outlet pressure. VCC 112 may include one or more compression stages and an electrically driven motor. The motor may be configured to receive electrical power, such as from a motor controller 120, and generate mechanical power to drive the one or more compression stages. Condenser 106 may be configured to receive saturated vapor refrigerant from VCC 112, condense the vapor refrigerant, and discharge saturated refrigerant to an expansion device 108. Condenser 106 may be cooled by environmental air, such as ram air flow, from a ram air system 102, or another fluid such as fuel or heat transport fluids.

Expansion device 108 may be configured to control flow of refrigerant to evaporator 110 and reduce a pressure of saturated refrigerant prior to entry into evaporator 110. Expansion device 108 may be an orifice, tube, metered valve, or other device configured to reduce a pressure of a saturated refrigerant. Evaporator 110 may be configured to receive cabin pressure air, such as from an air supply system 124, remove heat from cabin air using a refrigerant, and discharge cabin air to cabin/avionics 122. On a refrigerant side, evaporator 110 may be configured to receive saturated refrigerant, absorb heat from the cabin air, vaporize the refrigerant, and discharge superheated vapor refrigerant.

System 100 includes a control system 114 for controlling various conditions of VCS 104, such as refrigerant flow rate, refrigerant vapor composition, refrigerant temperature, and the like. Control system 114 may be configured to monitor and/or operate one or more process control components of system 100. For example, control system 114 may be communicatively coupled to any of air supply system 124, ram air system 102, VCC 112, expansion device 108, or any other component of system 100. Control system 114 may also be communicatively coupled to instrumentation, such as flow meters, temperature sensors, and pressure sensors, and configured to receive measurement signals from the instrumentation. For example, control system 114 may be configured to receive measurement signals for various parameters of VCS 104, such as a speed of VCC 112, temperature of cabin air leaving evaporator 110, or a superheat of vapor refrigerant entering VCC 112, determine a mismatch between the measurement signals and a setpoint for the corresponding parameter, and send a control signal to one or more components of system 100 to reduce the mismatch and return the parameter to within the setpoint. Control system 114 may include any of a wide range of devices, including processors (e.g., one or more microprocessors, one or more application specific integrated circuits (ASICs), one or more field programmable gate arrays (FPGAs), or the like), servers, desktop computers, notebook (i.e., laptop) computers, tablet computers, and the like.

Control system 114 may include a motor controller 120 configured to control a motor of VCC 112. As discussed above, a motor may provide mechanical power to impellers of VCC 112, and therefore modulate flow rate of refrigerant through VCS 104. The speed of VCC 112 may correspond to various temperature setpoints of VCS 104, such as cooling demands of evaporator 110 and inlet superheat of the vapor refrigerant into VCC 112. To control a speed of VCC 112, motor controller 120 may be configured to send control signals to VCC 112 to control an amount of electrical power to the motor of VCC 112, such as from an APU or other power supply. Control system 114 may include a vapor controller 116 configured to control a vapor composition of the refrigerant in VCS 104. To control a vapor composition of the refrigerant, vapor controller 116 may be configured to send control signals to expansion device 108 and/or evaporator 110 to control a position of expansion device 108 and/or a position of a bypass valve of evaporator 110, such as by closing expansion device 108 to increase a superheat of the refrigerant entering VCC 112. Control system 114 may include a pressure/flow controller 118 configured to control pressure and/or flow of supply air to evaporator 110. In some examples, pressure/flow controller 118 may be configured to control air supply system 124 to generate a particular flow of supply air from air supply system 124. For example, pressure/flow controller 118 may be configured to send control signals to air supply system 124 to control a pressure of supply air, such as by controlling an amount of bleed air or a speed of a load compressor (via an APU) or cabin air compressor. In some examples, pressure/flow controller 118 may be configured to control ram air system 102 in order to receive a particular flow of supply air from ram air system 102.

Vapor cooling system (e.g., vapor compression systems) discussed herein may include a centrifugal compressor to compress a vapor refrigerant and cool various components of the compressor using the vapor refrigerant as a cooling medium. For example, a compressor motor, shaft bearings, and other components of the centrifugal compressor that receive power and/or experience friction may produce heat that needs to be removed. Rather than remove this heat using external cooling, which may be heavy or inefficient to operate, centrifugal compressors described herein may use the incoming vapor refrigerant to cool various components of the centrifugal compressor, thereby reducing or eliminating external cooling of the centrifugal compressor.

Figure 2:
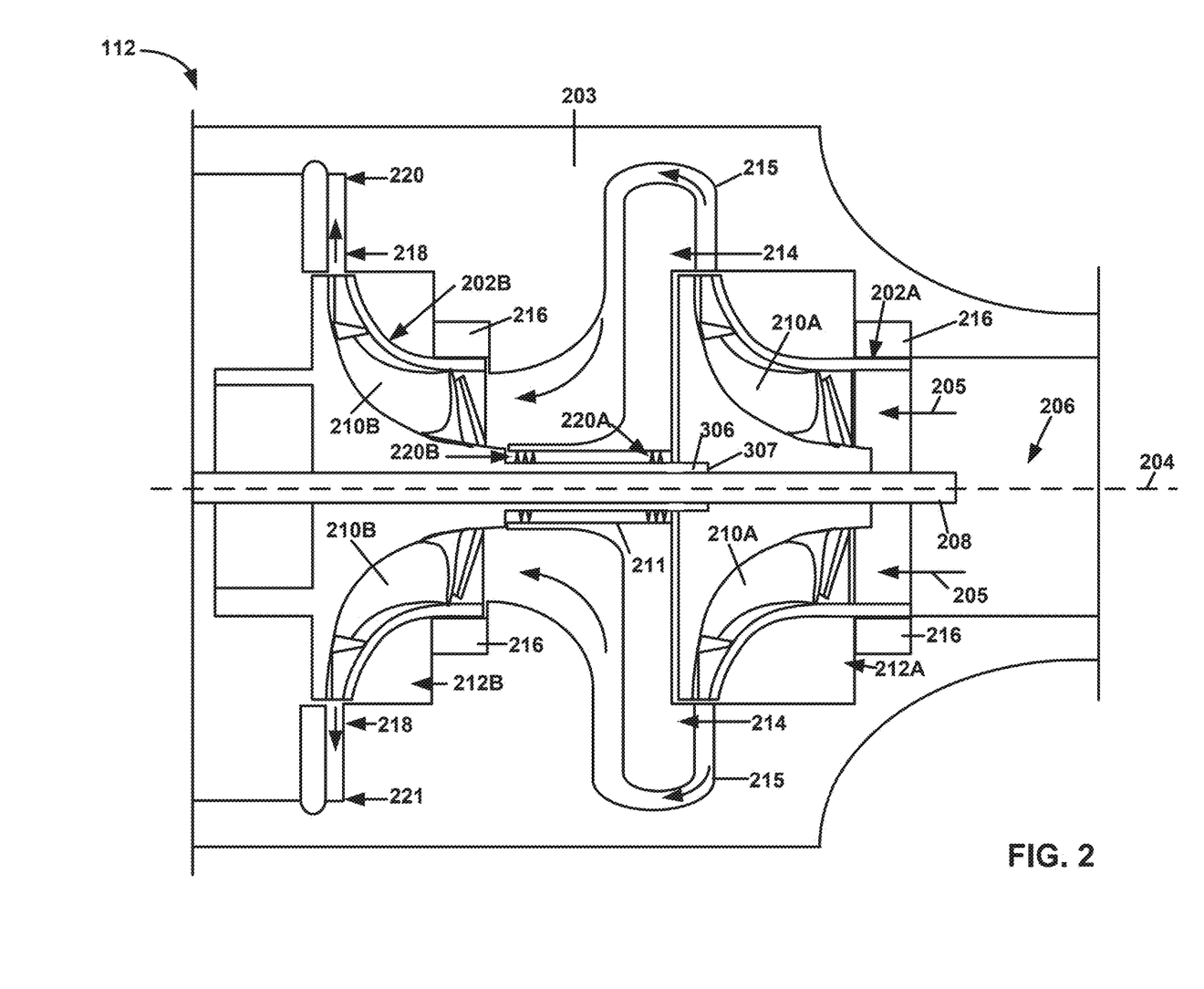
FIG. 2 is a conceptual diagram illustrating an example vapor cycle compressor (VCC).

Centrifugal compressors described herein may be configured to form a relatively tight containment to hermetically seal the vapor refrigerant within the vapor compression system. FIG. 2 is a conceptual diagram illustrating an example VCC 112. VCC 112 may include a first-stage compressor wheel 202A and a second-stage compressor wheel 202B (collectively referred to herein as "compressor wheels 202B"). VCC 112 may extend along a longitudinal axis 204 and may include compressor wheels 202 disposed along longitudinal axis 204 and within compressor housing 203 of VCC 112. Each of compressor wheels 202 may be a centrifugal compressor. VCC 112 may direct refrigerant 205 from inlet port 206 of housing 203 through compressor wheels 202 (e.g., through first-stage compressor wheel 202A and second-stage compressor wheel 202B in series) and out of one or more outlet port(s) 221 of housing 203. Refrigerant 205 may enter VCC 112 at inlet port 206 from evaporator 110 of VCS 104 and exit VCC 112 at outlet port(s) 221 into condenser 106 of VCS 104. While FIG. 2 illustrates two compressor wheels 202, other example VCC 112 described herein may include three or more compressor wheels 202 coupled in series.

Each compressor wheel 202 may include a compressor body extending along and around longitudinal axis 204. The compressor body may define a cylindrical body around longitudinal axis 204. First-stage compressor wheel 202A may be more distal to second-stage compressor wheel 202B (i.e., closer to inlet port 206 than second-stage compressor wheel 202B. Housing 203 may be configured to define a first chamber 212A configured to retain first-stage compressor wheel 202A and a second chamber 202B configured to retain second-stage compressor wheel 202B. First chamber 212A may be fluidically connected to second chamber 212B via one or more pathways 215 within housing 203. In such examples, refrigerant 205 may exit the outlet of first-stage compressor wheel 202A, enter first diffuser 214, and enter the inlet of second-stage compressor wheel 202B through pathway(s) 215. Refrigerant 205 may exit the outlet of second-stage compressor wheel 202B, pass through second diffuser 218, and exit VCC 112 through outlet port(s) 221.

One or more seals 216 may be disposed at or around an inlet of each of compressor wheels 202. Seals 216 may include one or more types of seals used in compressor systems including, but are not limited to, carbon seals or labyrinth seals. Seals 216 may interface with an outer surface of compressor wheels 202 to inhibit flow of refrigerant 205 around compressor wheels 202 and into one or more of chambers 212 (e.g., from inlet port 206 directly into first chamber 212A and bypassing first-stage compressor wheel 202A, from pathway(s) 215 directly into second chamber 212B and bypassing second-stage compressor wheel 202B).

Each compressor wheel 202 may include a corresponding impeller 210A, 210B (collectively referred to herein as "impellers 210") within a corresponding compressor body. Each of impellers 210 may include one or more blades disposed within an inner chamber of the compressor body. The inner chamber may be configured to retain refrigerant 205 within the compressor body. The one or more blades may be disposed around the circumference of the inner chamber of the compressor body. The one or more blades may be configured to rotate about longitudinal axis 204 as the respective compressor wheel 202 rotates about longitudinal axis 204. During rotation of compressor wheels 202, the one or more blades may push refrigerant 205 within the inner chambers of compressor wheels 202, thereby pressurizing refrigerant 205.

Housing 203 may define a channel 211 along longitudinal axis 204. Channel 211 may be configured to retain a drive shaft extending from a centrifugal motor. The drive shaft may include an inner shaft 208 disposed within an outer shaft 306. Inner shaft 208 may be directly coupled to the motor and outer shaft 306 may be affixed to inner shaft 208. Each of compressor wheels 202 may include features disposed within channel 211 or on each compressor body (e.g., on outer shaft 306) which may removably or permanently affix compressor wheels 202 to inner shaft 208. In some examples, as illustrated in FIG. 2, at least a portion of at least one compressor wheel 202 (e.g., of second-stage compressor wheel 202B) may form outer shaft 306 around inner shaft 208. Outer shaft 306 may be received within a recess 307 in first-stage compressor wheel 202A, e.g., to affix second-stage compressor wheel 202B to first-stage compressor wheel 202A. When compressor wheels 202 are affixed to inner shaft 208, rotation of inner shaft 208 about longitudinal axis 204 may cause compressor wheels 202 to rotate about longitudinal axis 204 in a same direction as inner shaft 208, thereby causing impellers 210 within compressor wheels 202 to compress refrigerant 205.

VCC 112 may include two or more helical seals 220A, 220B (collectively referred to herein as "helical seals 220") disposed within channel 211. Helical seals 220 may be disposed on inner shaft 208, e.g., directly on and/or integrated into inner shaft 208. In some examples, helical seals 220 may be disposed on an outer surface of an outer shaft configured to receive inner shaft 208). Helical seals 220 may define a helical structure revolving around the circumference of inner shaft 208 or the outer shaft. Each helical seal 220 may define at least one complete revolution around the circumference of inner shaft 208 or the outer shaft.

Helical seals 220 may define different directions of rotations. For each helical seal 220, the direction of rotation may be the same as or different from the direction of rotation for compressor wheels 202 and/or inner shaft 208. For example, as illustrated in FIG. 2, first helical seal 220A is wound in a same direction as the direction of rotation for compressor wheels 202 and inner shaft 208 (e.g., clockwise) and second helical seal 220B is wound in the opposite direction (e.g., counterclockwise) as the direction of rotation for compressor wheels 202 and inner shaft 208. When inner shaft 208 rotates about longitudinal axis 204, inner shaft 208 may cause helical seals 220 to rotate about longitudinal axis 204 within channel 211. When rotated, helical seals 220 may urge refrigerant 205 around each helical seal 220 to travel in a particular direction (e.g., through the respective helical seal 220) based on the direction of winding of the respective helical seal 220. For example, as illustrated in FIG. 2, when rotated, first helical seal 220A is configured to urge refrigerant 205 distally towards first-stage compressor wheel 202A and second helical seal 220B is configured to urge refrigerant 205 proximally towards second-stage compressor wheel 202B. In such examples, helical seals 220 may urge refrigerant 205 back towards a closest point of entry into channel 211 and inhibit flow of refrigerant 205 across the entire longitudinal length of channel 211.

Each compressor wheel 202 may define an inlet and an outlet. For each compressor wheel 202, the inlet and the outlet may each extend at least partially around longitudinal axis 204. For example, for each compressor wheel 202, the inlet and the outlet may define a complete ring around longitudinal axis 204.

Housing 203 may define one or more pathways 215 fluidically connecting compressor wheels 202. Pathway(s) 215 may be fully enclosed and may revolve at least partially around longitudinal axis 204. For example, as illustrated in FIG. 2, pathway(s) 215 may define a torus shape radially outwards of compressor wheels 202. Outlet port(s) 221 may be configured to output refrigerant 205 out of VCC 112. Outlet port(s) 221 may define one or more openings fluidically coupled to a downstream component within the refrigeration circuit (e.g., condenser 106). In some examples, as illustrated in FIG. 2, outlet port(s) 221221 defines a torus shape radially outwards of compressor wheels 202 Housing 203 may hermetically seal refrigerant 205 from an environment outside of VCC 112 aside from inlet port 206 and outlet port(s) 221.

Refrigerant 205 may include a low-pressure refrigerant (e.g., a refrigerant having a relatively low saturation vapor pressure). For example, the refrigerant gas may be R-1233zd, r236fa, or r245fa, or a similar low-pressure refrigerant, as described herein.

A compressor motor may be coupled to inner shaft 208 and may be configured to rotate inner shaft 208 to rotate compressor wheels 202. The centrifugal motor may include windings of a stator coupled to compressor wheels 202 and/or housing 203 and a rotor coupled to inner shaft 208. Windings of the stator may be configured to receive an electrical signal from motor controller 120 and generate a dynamic magnetic field to drive the rotor. In some examples, the compressor motor may be configured to rotate compressor wheels 202 at about 80,000 rotations per minute (RPM) or greater. For example, the compressor motor may be configured to spin compressor wheels 202 at approximately 120,000 RPM.

Figure 3:
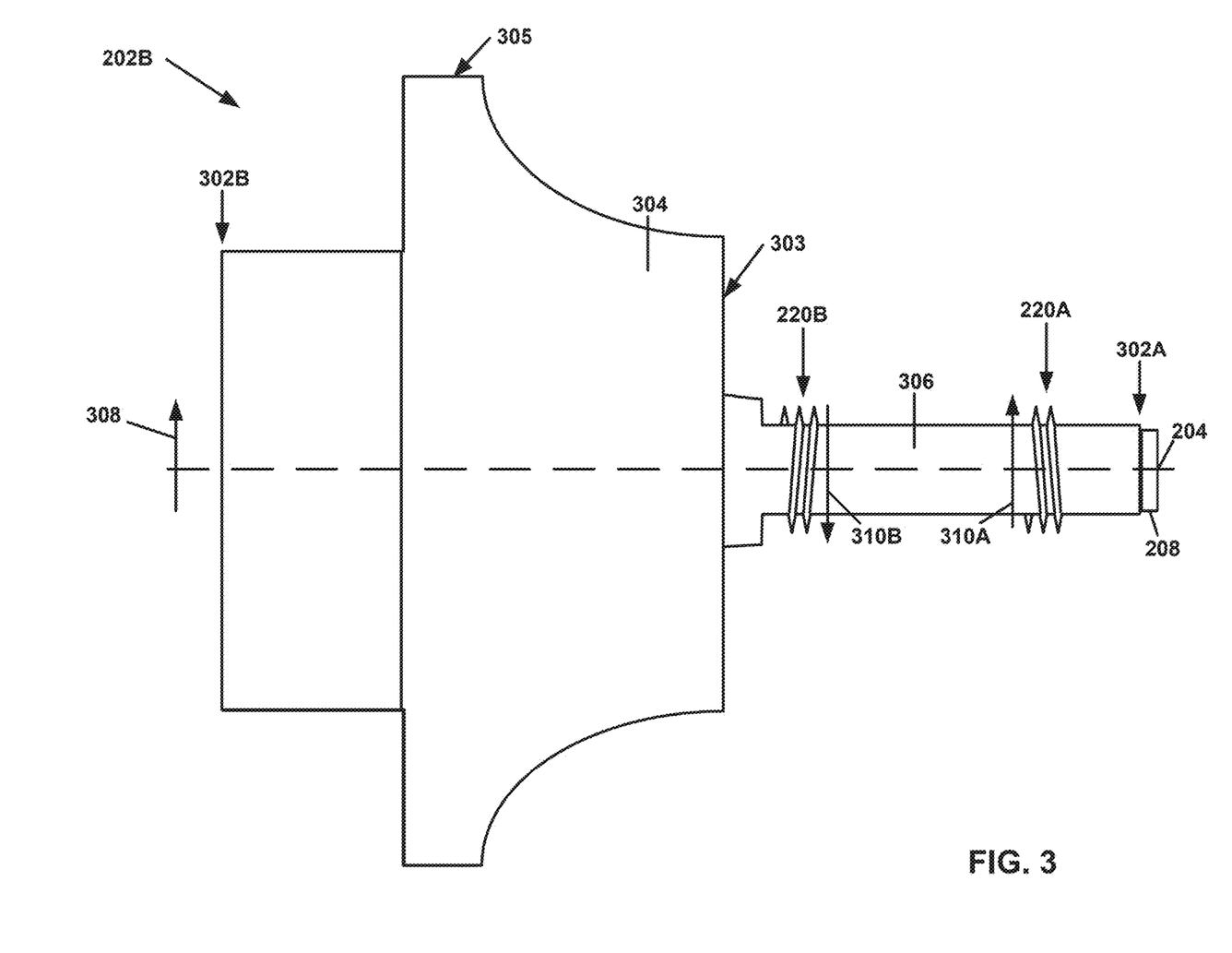
FIG. 3 is a conceptual diagram illustrating an example second-stage compressor wheel and example drive shaft of the example centrifugal compressor of FIG. 2.

FIG. 3 is a conceptual diagram illustrating an example second-stage compressor wheel 202B and example inner shaft 208 of the example VCC 112 of FIG. 2. Second-stage compressor wheel 202B may extend from a first end 302A to a second end 302B along longitudinal axis 204. In some examples, as illustrated in FIG. 3, inner shaft 208 may be disposed within and coupled to an outer shaft 306. Outer shaft 306 maybe integrated into second-stage compressor wheel 202B, as illustrated in FIG. 3. In some examples, outer shaft 306 is a separate component from second-stage compressor wheel 202B and may be removably or fixedly attached to second-state compressor wheel 202B.

Second-stage compressor wheel 202B may include compressor body 304 extending from second end 302B towards first end 302A and defining an inner chamber of second-stage compressor wheel 202B. Compressor body 304 may define an inlet 303 and an outlet 305 of second-state compressor wheel 202B. The inner chamber of second-stage compressor wheel 202B may extend from inlet 303 to outlet 305 and may include impeller 210B (pictured in FIG. 2) disposed within the inner chamber.

Outer shaft 306 may define an elongated cylindrical body extending along longitudinal axis 204. Outer shaft 306 may define an inner lumen sized to receive inner shaft 208. In some examples, outer shaft 306 may include one or more attachment features disposed on an inner surface defining the inner lumen. The one or more attachment features may interface with corresponding features on the outer surface of inner shaft 208 to affix outer shaft 306 to inner shaft 208. In some examples, inner shaft 208 is affixed to second-stage compressor wheel 202B and, by extension, outer shaft 306 at a location within compressor body 304.

Helical seals 220 may be affixed to outer shaft 306 (e.g., as illustrated in FIG. 3) or to an outer surface of inner shaft 208 (e.g., in the event that no outer shaft 306 is present). As illustrated in FIG. 3, helical seals 220 are wound in different directions and are defined by different parameters. For example, different helical seals 220 may define different pitches, number of complete revolutions, pitch angles, height (e.g., along a reference axis orthogonal to longitudinal axis 204), or the like.

In the example illustrated in FIG. 3, first helical seal 220A is wound about outer shaft 306 in a same direction as the direction of revolution of inner shaft 208 while second helical seal 220B is wound about outer shaft 306 in the opposite direction. Additionally, in the example illustrated in FIG. 3, first helical seal 220A extends towards first end 302A while second helical seal 220B extends towards second end 302B. In such examples, first helical seal 220A may direct refrigerant 205 around outer shaft 306 and/or inner shaft 208 distally towards first-stage compressor wheel 202A while second helical seal 220B may direct refrigerant 205 around outer shaft 306 and/or inner shaft 208 proximally towards second-stage compressor wheel 202B, e.g., towards inlet 303. For example, second helical seal 220B may block and re-direct distal flow of refrigerant 205 (e.g., from inlet 303) back towards inlet 303. Additionally, the direction of winding of second helical seal 220B, (e.g., around longitudinal axis 204, along longitudinal axis 204) may help urge refrigerant 205 located around outer shaft 306 and/or inner shaft 208 at a position distal to the position of second helical seal 220B back towards inlet 303 of second compressor wheel 202B. Helical seals 220 may be longitudinally adjacent to each or may be separated by a set distance along the longitudinal length of outer shaft 306. In some examples, helical seals 220 may be positioned along the longitudinal length of outer shaft 306, e.g., to be evenly distributed along the length of outer shaft 306. The even distribution may facilitate balancing of outer shaft 306 and inner shaft 208 within channel 211.

Compressor wheels 202 (e.g., compressor wheels 202A, 202B) may rotate about longitudinal axis 204 in a direction 308. Direction 308 may be clockwise (e.g., as illustrated in FIG. 3) or counterclockwise. Inner shaft 208 may rotate about longitudinal axis 204 in direction 308 and cause compressor wheels 202A (not pictured in FIGS. 3) and 202B to rotate about longitudinal axis 204 in direction 308.

Each helical seals 220 may be wound around longitudinal axis 204 in a corresponding direction (e.g., of direction 310A, 310B, collectively referred to herein as "directions 310"). For example, as illustrated in FIG. 3, first helical seal 220A may be wound around longitudinal axis 204 in first direction 310A and second helical seal 220B may be wound around longitudinal axis 204 in second direction 310B. First direction 310A may be the same as or may be different to (e.g., opposite to) second direction 310A. In some examples, as illustrated in FIG. 3, first direction 310A may be in the same direction as direction 308 and second direction 310B may be opposite to direction 308. In some examples, the winding of second helical seal 220B in second direction 310B may cause second helical seal 220B to direct refrigerant 205 back towards second-stage compressor wheel 202B when compressor wheels 202 and helical seals 220 are rotated about longitudinal axis 204 in direction 308. In some examples, the winding of first helical seal 220A in first direction 310A may cause first helical seal 220A to direct refrigerant 205 towards first-stage compressor wheel 202A when compressor wheels 202 and helical seals 220 are rotated about longitudinal axis 204 in direction 308.

Figure 4A:
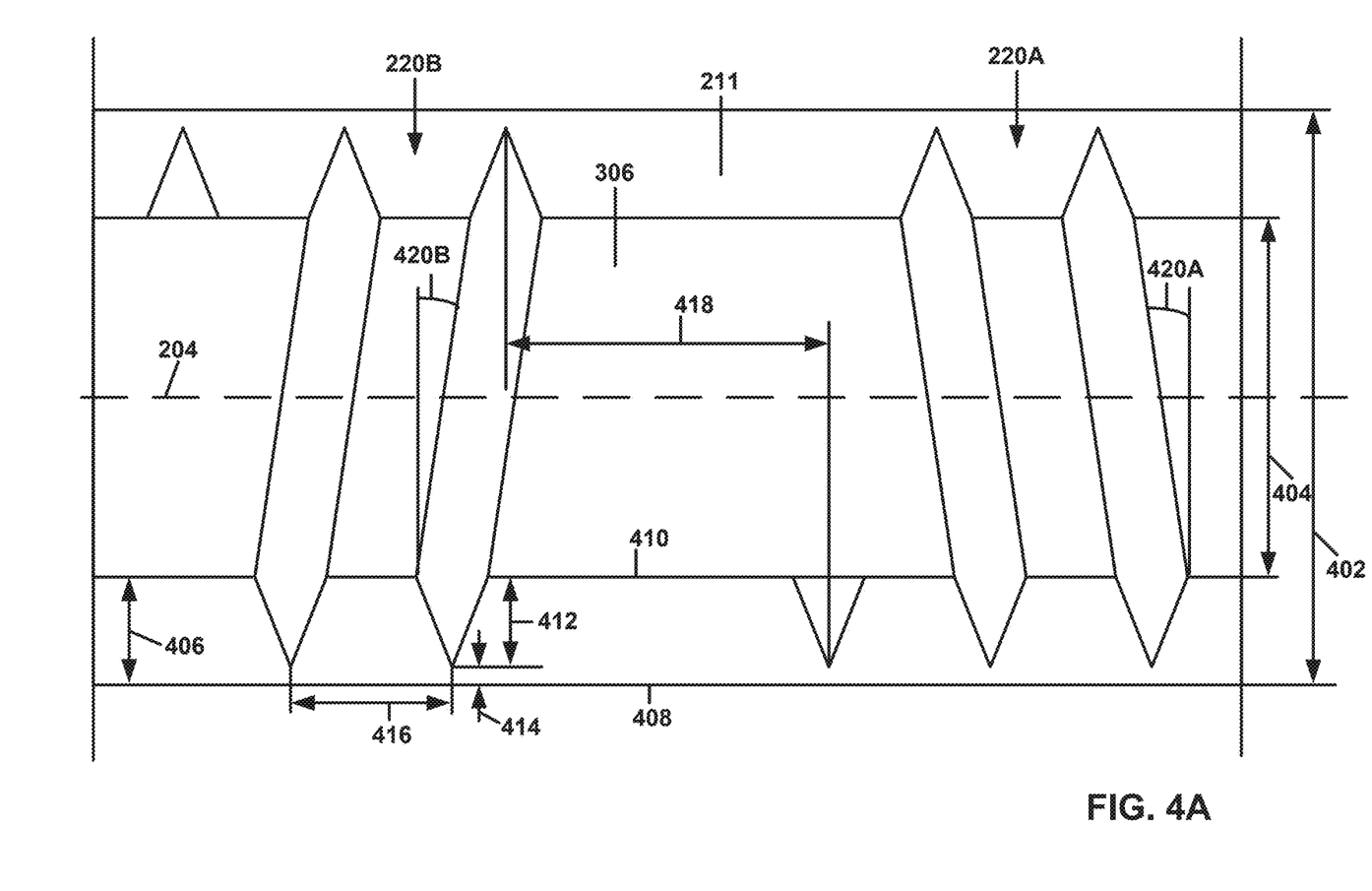
FIG. 4A is a conceptual diagram illustrating an example of the outer shaft of FIG. 3.

FIG. 4A is a conceptual diagram illustrating an example of outer shaft 306 of FIG. 3 disposed within channel 211. When outer shaft 306 is disposed within channel 211, the longitudinal axes of outer shaft 306 and channel 211 may be aligned, e.g., along longitudinal axis 204. Outer shaft 306 may define an outer diameter 404 and channel 211 may define an inner diameter 402. An outer surface 410 of outer shaft 306 may be separated from an inner surface 408 of channel 211 by up to distance 406. Outer shaft 306 may include a plurality of helical seals 220 extend away from outer surface 410 of outer shaft 306. Each of helical seals 220 may extend up to a distance 412 from outer surface 410. A clearance between a maximum diameter of outer shaft 306 (e.g., as defined by the radially-outward most points on helical seals 220) and inner surface 408 of channel 211 is distance 414. For example, distance 406 from outer surface 410 to inner surface 408 is equal to a sum of distance 412 and distance 414. Distance 414 may be up to about 0.5 millimeters (mm) (e.g., up to about 0.04 inches (in)).

Each of helical seals 220 may define same or different parameters as another of helical seals 220. Parameters may include, but are not limited to, an outer diameter of each helical seal 220, a pitch 416 of each helical seal 220, a helical angle (e.g., helical angles 420A, 420B, collectively referred to herein as "helical angles 420) of each helical seal 220, a number of revolutions around the outer circumference of outer shaft 306 for each helical seal 220, or the like. In some examples, where helical seals 220 include three or more helical seals, at least two helical seals 220 may define the same parameters.

Helical seal 220A may define a same or different pitch 416 as helical seal 220B. Each helical seal 220 may define a uniform or variable pitch along the longitudinal length of helical seal 220. In some examples, helical seals 220 may define helical angles 420A, 420B with a same or different magnitude. In some examples, as illustrated in FIG. 4, helical seals 220A, 220B define respective helical angles 420A, 420B with the same magnitudes and different directions, such that helical seal 220A extends towards one end (e.g., a distal end) of channel 211 and helical seals 220B extends towards an opposite end (e.g., a proximal end) of channel 211. Helical seals 220 may each define at least two complete revolutions around the circumference of outer shaft 306 (e.g., at least three complete revolutions. The number of complete revolutions may vary as a function of outer diameter 404. For example, an increased outer diameter 404 may require helical seals 220 to complete more revolutions around the circumference of outer shaft 306 (e.g., to achieve substantially similar sealing properties), or vice versa.

In some examples, helical seals 220 may be longitudinally adjacent to each other. In some examples, helical seals 220 may be separated by up to distance 418. Outer shaft 306 may include one or more other seals disposed between helical seals 220. The one or more other seals may include, but are not limited to, carbon seals, ring seals, or other helical seals. Helical seals 220 may be integral to or integrated into a drive shaft of VCC 112 (e.g., into outer shaft 306 and/or inner shaft 208).

Figure 4B:
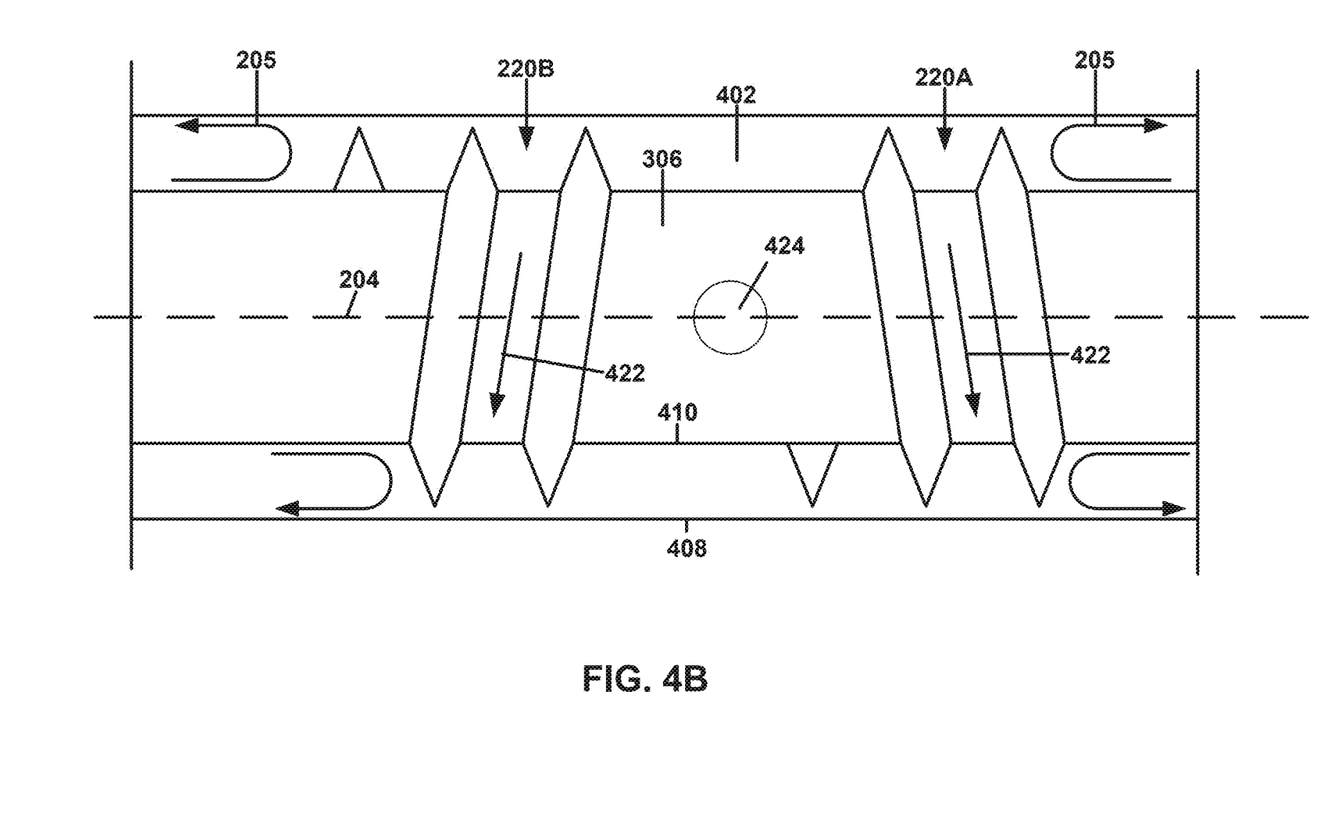
FIG. 4B is a conceptual diagram illustrating another view of the example outer shaft of FIG. 4A.

FIG. 4B is a conceptual diagram illustrating another view of outer shaft 306 within channel 211. As illustrated in FIG. 4B, helical seals 220 may rotate with outer shaft 306 to inhibit flow of refrigerant 205 across helical seals 220 and re-direct the flow of refrigerant 205 back towards the entrances to channel 211 at the proximal and distal end of channel 211. Refrigerant 205 may flow through helical seals 220 along pathways 422 to be expelled towards the entrances to channel 211. First helical seal 220A may be wound in a same direction as the direction of rotation of outer shaft 306 to force refrigerant 205 within channel 211 to travel along pathways 422 towards a distal entrance to channel 211 (e.g., at a distal end of channel 211). Second helical seal 220B may be wound in an opposite direction as the direction of rotation of outer shaft 306 to force refrigerant 205 within channel 211 to travel along pathways 422 towards a proximal entrance to channel 211 (e.g., at a proximal end of channel 211).

Outer shaft 306 may include one or more features 424 extending through at least partially through outer shaft 306. In some examples feature(s) 424 may include openings configured to retain a fixation feature coupling outer shaft 306 to inner shaft 208 disposed within outer shaft 306. In some examples, feature(s) 424 may include openings, recesses, protrusions or the like to facilitate balancing of outer shaft 306 and inner shaft 208 within channel 211. In some examples, feature(s) 424 may include one or more seals to further inhibit the flow of refrigerant 205 through channel 211. Feature(s) 424 may be disposed between two longitudinally adjacent helical seals 220 (e.g., between helical seals 220A, 220B), distal to one or more helical seals 220 (e.g., distal to first helical seal 220A), proximal to one or more helical seals 220 (e.g., proximal to second helical seal 220B), or at any other location along outer shaft 306.

Figure 5:
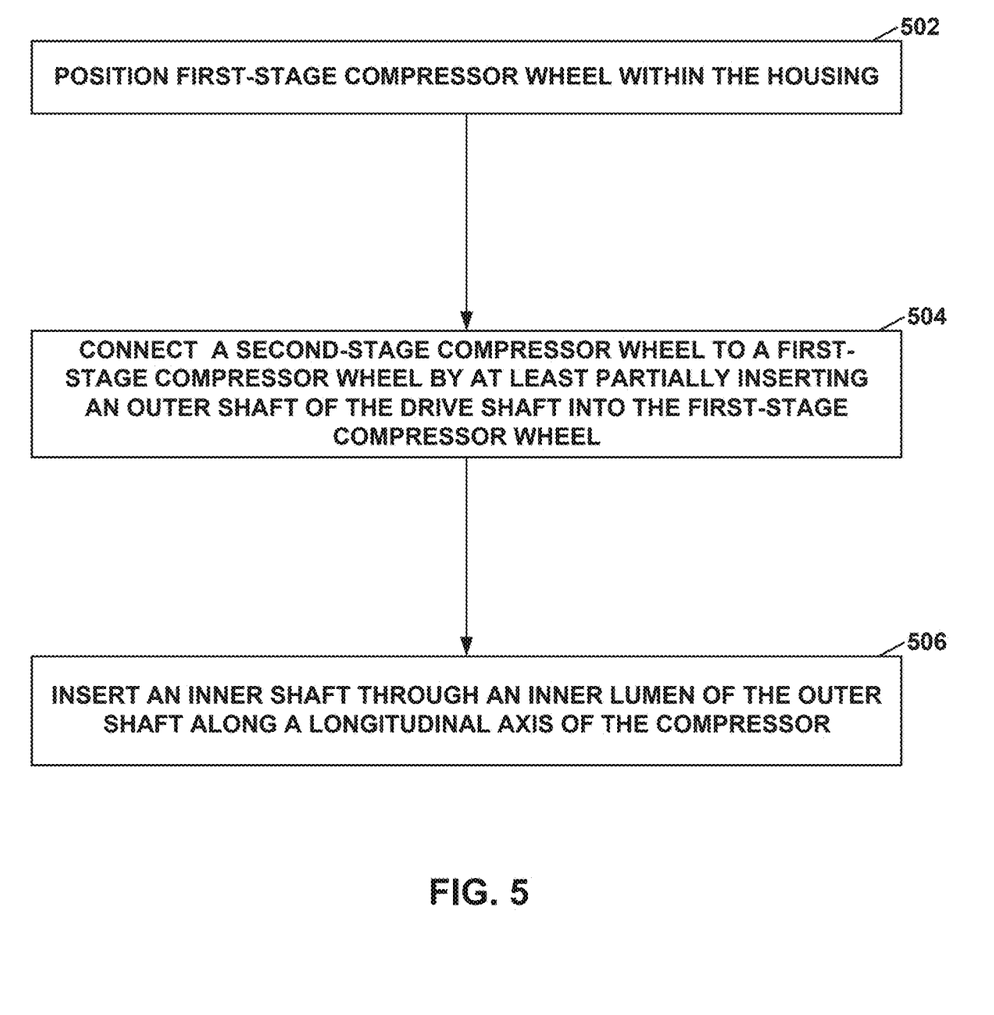
FIG. 5 is a flow diagram illustrating an example process of assembling the VCC of FIG. 2.

FIG. 5 is a flow diagram illustrating an example process of assembling VCC 112 of FIG. 2. While FIG. 5 illustrates the steps of the example process in one order, the steps may be performed by a manufacturing assembly in any other order. Additionally, while FIG. 5 is primarily described with reference to VCC 112 illustrated in FIGS. 2-4B, the example process may be performed by a manufacturing assembly to assembly any other VCC 112 described herein.

The manufacturing assembly may position first-stage compressor wheel 202A within housing 203 (502). Housing 203 may define a first chamber 212A configured to receive first-stage compressor wheel 202A. The manufacturing assembly may position first-stage compressor wheel 202A within first chamber 212A such that an inner lumen within first-stage compressor wheel 202A configured to receive inner shaft 208 is aligned with longitudinal axis 204. When first-stage compressor wheel 202A is positioned within first chamber 212A, an inlet of first-stage compressor wheel 202A is orientated towards inlet port 206 of VCC 112. When first-stage compressor wheel 202A is positioned within first chamber 212A, the outlets of first-stage compressor wheel 202A may be aligned with first diffuser 214 and the entrances to pathway(s) 215.

The manufacturing assembly may connect a second-stage compressor wheel 202B to first-stage compressor wheel 202A by at least partially inserting an outer shaft 306 of the drive shaft into first-stage compressor wheel 202A (504). Outer shaft 306 may be integral or otherwise fixedly attached to second-stage compressor wheel 202B and may extend distally from a distal end of second-stage compressor wheel 202B. The manufacturing assembly may assemble one or more portions of housing 203 around a proximal end first-stage compressor wheel 202A to retain first-stage compressor wheel 202A within first chamber 212A and define channel 211 extending to second chamber 212B. The manufacturing assembly may insert second-stage compressor wheel 202B into second chamber 212B and outer shaft 306 into channel 211. The manufacturing assembly may advance outer shaft 306 along longitudinal axis 204 and through channel 211 until a distal end of outer shaft 306 enters recess 307 at proximal end of first-stage compressor wheel 202A. The manufacturing assembly may affix the distal end of outer shaft 306 to recess 307 of first-stage compressor wheel 202A (e.g., via a friction fit, an adhesive, or one or more fixation features). When outer shaft 306 is disposed within channel 211, helical seals 220 may be disposed within channel 211.

The manufacturing assembly may insert inner shaft 208 of the drive shaft through an inner lumen of outer shaft 306 along longitudinal axis 204 (506). The inner lumen of outer shaft 306 may be sized to retain inner shaft 208. The manufacturing assembly may insert inner shaft 208 through the inner lumens of second-stage compressor wheel 202B, outer shaft 306, and first-stage compressor wheel 202A, e.g., until a distal end of inner shaft 208 is within or distal to the compressor body of first-stage compressor wheel 202A. The manufacturing assembly may then affix inner shaft 208 to first-stage compressor wheel 202A and to one or more of second-stage compressor wheel 202B or outer shaft 306. Once affixed, rotation of inner shaft 208 about longitudinal axis 204 may cause compressor wheels 202 and outer shaft 306 to rotate about longitudinal axis 204 in a same direction. In some examples, inner shaft 208 may be inserted into outer shaft 306 and/or affixed to second-stage compressor wheel 202B and/or to outer shaft 306 prior to the insertion of outer shaft 306 into recess 307.

Once the manufacturing assembly affixes inner shaft 208 to first-stage compressor wheel 202A, second-stage compressor wheel 202B, and/or to outer shaft 306, the manufacturing assembly may affix a proximal end of inner shaft 208 to a centrifugal motor of VCC 112. In response to a torque from the motor, inner shaft 208 may transmit the received torque to compressor wheels 202 and outer shaft 306 to cause compressor wheels 202 and outer shaft 306 to rotate about longitudinal axis 204, e.g., to pressurize and output pressurized refrigerant 205 through VCC 112. When outer shaft 306 is rotating within channel 211, helical seals 220 may inhibit and re-direct refrigerant 205 within channel 211 to prevent the unintended flow of refrigerant 205 between compressor wheels 202 through channel 211. The manufacturing assembly may then complete assembly of the remainder of VCC 112 (e.g., the remainder of housing 203) to fully enclose and encapsulate compressor wheels 202 within housing 203.

The following examples may illustrate one or more of the techniques of this disclosure.

Example 1: a compressor comprising: an drive shaft; a first compressor wheel; a second compressor wheel connected to the first compressor wheel via the drive shaft; and two or more helical seals disposed on the drive shaft, each helical seal of the two or more helical seals extending away from an outer surface of the drive shaft and around a circumference of the drive shaft, wherein the two or more helical seals are configured to inhibit flow of fluid between the first compressor wheel and the second compressor wheel.

Example 2: the compressor of example 1, wherein the two or more helical seals comprise a first helical seal adjacent to the first compressor wheel and a second helical seal adjacent to the second compressor wheel.

Example 3: the compressor of example 2, wherein the compressor is configured to direct the fluid from the first compressor wheel to the second compressor wheel, wherein the first helical seal is wound in a same direction as a direction of rotation of the drive shaft, and wherein the second helical seal is wound in an opposite direction relative to the direction of rotation of the drive shaft.

Example 4: the compressor of example 3, wherein the first helical seal is configured to direct the fluid around the drive shaft towards the first compressor wheel, and wherein the second helical seal is configured to direct the fluid around the drive shaft towards the second compressor wheel.

Example 5: the compressor of any of examples 1-4, wherein the two or more helical seals are integrated into the drive shaft.

Example 6: the compressor of any of examples 1-5, wherein the first compressor wheel extends along a longitudinal axis from a first end to a second end, wherein the second compressor wheel extends along the longitudinal axis from a third end to a fourth end, and wherein the two or more helical seals are longitudinally disposed between the second end of the first compressor wheel and the third end of the second compressor wheel.

Example 7: the compressor of example 6, wherein the drive shaft comprises: an outer shaft extending from the first compressor wheel to the second compressor wheel; and an inner shaft disposed radially inwards of the outer shaft and extending through the first compressor wheel and the second compressor wheel, wherein the two or more helical seals are disposed on the outer shaft of the drive shaft.

Example 8: the compressor of any of examples 1-7, wherein each helical seal of the two or more helical seals defines at least two complete revolutions around the circumference of the drive shaft.

Example 9: the compressor of any of examples 1-8, wherein each helical seal of the two or more helical seals extends from the outer surface of the drive shaft to an outermost edge.

Example 10: the compressor of any of examples 1-9, further comprising a housing configured to retain the first compressor wheel, the second compressor wheel, and the drive shaft, wherein the housing defines a channel sized to retain the drive shaft, and wherein a distance between the outermost edge of each helical seal and an inner surface of the channel is up to 0.05 millimeters (mm).

Example 11: the compressor of any of examples 1-10, further comprising one or more secondary seals disposed on the outer surface of the drive shaft.

Example 12: the compressor of any of examples 1-11, wherein for each helical seal of the two or more helical seals, a first set of one or more parameters defining the helical seal are substantially similar to a second set of one or more parameters defining another helical seal of the two or more helical seals, and wherein each of the first set of one or more parameters and the second set of one or more parameters comprises one or more of: a pitch of the helical seal; a helical angle of the helical seal; a number of revolutions around the circumference of the drive shaft; a longitudinal length of the helical seal; or an outer diameter of the helical seal.

Example 13: the compressor of example 12, wherein each helical seal of the two or more helical seals defines a same number of revolutions around the circumference of the drive shaft.

Example 14: a compressor system comprising: a compressor comprising: a first compressor wheel; a second compressor wheel; an drive shaft extending along a longitudinal axis from a proximal end to a distal end, wherein the drive shaft extends through the first compressor wheel and the second compressor wheel and connects the first compressor wheel to the second compressor wheel, and wherein the distal end of the drive shaft is distal to the first compressor wheel; and two or more helical seals disposed on the drive shaft, each helical seal of the two or more helical seals extending away from an outer surface of the drive shaft and around a circumference of the drive shaft; a housing configured to retain the compressor, the housing comprising: a channel extending along the longitudinal axis and configured to retain the drive shaft, wherein the two or more helical seals are configured to inhibit flow of fluid between the first compressor wheel and the second compressor wheel through the channel; and a motor coupled to the proximal end of the drive shaft and configured to apply a rotary force on the drive shaft.

Example 15: the compressor system of example 14, wherein the two or more seals comprise a first helical seal adjacent to the first compressor wheel and a second helical seal adjacent to the second compressor wheel.

Example 16: the compressor system of example 15, wherein the housing comprises one or more channels fluidically connecting the first compressor wheel to the second compressor wheel, wherein rotation of the drive shaft in a first direction causes the first compressor wheel to direct the fluid along the one or more channels and into the second compressor wheel.

Example 17: the compressor system of example 16, wherein the first helical seal is wound in the first direction, and wherein the second helical seal is wound in a second direction opposite the first direction.

Example 18: the compressor system of any of examples 15-17, wherein the first helical seal is configured to direct fluid entering a distal end of the channel towards the first compressor wheel, and wherein the second helical seal is configured to direct fluid entering a proximal end of the channel towards the second compressor wheel.

Example 19: the compressor system of any of examples 14-18, wherein the two or more helical seals are integrated into the drive shaft.

Example 20: the compressor system of any of examples 14-19, wherein each helical seal of the two or more helical seals defines at least two complete revolutions around the circumference of the drive shaft.

Example 21: the compressor system of any of examples 14-20, wherein a distance between an inner surface of the channel and an outermost edge of at least one helical seal of the two or more helical seals is up to 0.05 millimeters (mm).

Example 22: the compressor system of any of examples 14-21, wherein the compressor further comprises one or more secondary seals disposed on the outer surface of the drive shaft.

Example 23: the compressor system of any of examples 14-22, wherein one or more parameters for each helical seal of the two or more helical seals are substantially similar to the one or more parameters for another helical seal of the two or more helical seals, and wherein for each helical seal of the two or more helical seals, the one or more parameters comprises one or more of: a pitch of the helical seal; a helical angle of the helical seal; a number of revolutions completed by the helical seal around the circumference of the drive shaft; a longitudinal length of the helical seal along the longitudinal axis; or an outer diameter of the helical seal.

Example 24: the compressor system of example 23, wherein each helical seal of the two or more helical seals completes a same number of revolutions around the circumference of the drive shaft.

Example 25: a method comprising: position a first compressor wheel of a compressor within a housing; connecting a second compressor wheel of the compressor to the first compressor wheel by at least partially inserting an outer shaft of an drive shaft of the compressor into the first compressor wheel, wherein the outer shaft is connected to the second compressor wheel, and wherein the outer shaft of the drive shaft comprises: two or more helical seals disposed on the outer shaft, each helical seal of the two or more helical seals extending away from an outer surface of the outer shaft and around a circumference of the outer shaft; inserting an inner shaft of the drive shaft through an inner lumen of the outer shaft along a longitudinal axis of the compressor; and affixing the inner shaft to the first compressor wheel and the second compressor wheel.

Example 26: the method of example 25, wherein the housing defines an inner channel extending along the longitudinal axis from a proximal end to a distal end, and wherein inserting the outer shaft into the first compressor wheel comprises: inserting the outer shaft into the proximal end of the inner channel; advancing the outer shaft along the longitudinal axis until a distal end of the outer shaft extends past the distal end of the inner channel; and affixing the distal end of the outer shaft to the first compressor wheel, wherein when the outer shaft is affixed to the first compressor wheel, the two or more helical seals are positioned within the inner channel.

Example 27: the method of example 26, wherein a distance between an outermost edge of each helical seal of the two or more helical seals and an inner surface of the inner channel is up to 0.05 millimeters (mm).

Example 28: the method of any of examples 26 or 27, wherein the two or more helical seals comprises a first helical seal adjacent to the distal end of the outer shaft and a second helical seal adjacent to the second compressor wheel, wherein the first helical seal is configured to direct fluid entering the inner channel from the distal end of the inner channel towards the first compressor wheel, and wherein the second helical seal is configured to direct fluid entering the inner channel from the proximal end of the inner channel towards the second compressor wheel.

Example 29: the method of any of examples 25-28, wherein the inner shaft is coupled to a motor, wherein the motor is configured to cause the compressor to rotate about the longitudinal axis in a first direction, and wherein the first helical seal is wound around the circumference of the outer shaft in the first direction and the second helical seal is wound around the circumference of the outer shaft in a second direction opposite the first direction.

Example 30: the method of any of examples 25-29, wherein the two or more helical seals are integrated into the outer shaft of the drive shaft.

Example 31: the method of any of examples 25-30, wherein each helical seal of the two or more helical seals defines at least two complete revolutions around the circumference of the outer shaft.

Example 32: the method of any of examples 25-31, wherein one or more parameters for each helical seal of the two or more helical seals are substantially similar to the one or more parameters for another helical seal of the two or more helical seals, and wherein for each helical seal of the two or more helical seals, the one or more parameters comprises one or more of: a pitch of the helical seal; a helical angle of the helical seal; a number of revolutions completed by the helical seal around the circumference of the outer shaft of the drive shaft; a longitudinal length of the helical seal along the longitudinal axis; or an outer diameter of the helical seal.

A "vehicle" may be an aircraft, a land vehicle such as an automobile, or a water vehicle such as a ship or a submarine. An "aircraft" as described and claimed herein may include any fixed-wing or rotary-wing aircraft, airship (e.g., dirigible or blimp buoyed by helium or other lighter-than-air gas), suborbital spaceplane, spacecraft, expendable or reusable launch vehicle or launch vehicle stage, or other type of flying device. An "aircraft" as described and claimed herein may include any crewed or uncrewed craft (e.g., uncrewed aerial vehicle (UAV), flying robot, or automated cargo or parcel delivery drone or other craft).

What is claimed is:

1. A compressor comprising:
    a first compressor wheel;
    a second compressor wheel;
    a drive shaft connecting the first compressor wheel to the second compressor wheel, the drive shaft comprising:
        an outer shaft extending from the first compressor wheel to the second compressor wheel; and
        an inner shaft disposed radially inwards of the outer shaft and extending through the first compressor wheel and the second compressor wheel; and
    two or more helical seals disposed on the outer shaft of the drive shaft, each helical seal of the two or more helical seals extending away from an outer surface of the outer shaft and around a circumference of the outer shaft, wherein an outer diameter of each helical seal of the two or more helical seals is greater than an outer diameter of the outer shaft, and wherein the two or more helical seals are configured to inhibit flow of fluid between the first compressor wheel and the second compressor wheel.

2. The compressor of claim 1, wherein the two or more helical seals comprise a first helical seal adjacent to the first compressor wheel and a second helical seal adjacent to the second compressor wheel.

3. The compressor of claim 2, wherein the compressor is configured to direct the fluid from the first compressor wheel to the second compressor wheel, wherein the first helical seal is wound in a same direction as a direction of rotation of the drive shaft, and wherein the second helical seal is wound in an opposite direction relative to the direction of rotation of the drive shaft.

4. The compressor of claim 3, wherein the first helical seal is configured to direct the fluid around the drive shaft towards the first compressor wheel, and wherein the second helical seal is configured to direct the fluid around the drive shaft towards the second compressor wheel.

5. The compressor of claim 1, wherein the two or more helical seals are integrated into the drive shaft.

6. The compressor of claim 1, wherein the first compressor wheel extends along a longitudinal axis from a first end to a second end, wherein the second compressor wheel extends along the longitudinal axis from a third end to a fourth end, and wherein the two or more helical seals are longitudinally disposed between the second end of the first compressor wheel and the third end of the second compressor wheel.

7. The compressor of claim 1, wherein each helical seal of the two or more helical seals defines at least two complete revolutions around the circumference of the drive shaft.

8. The compressor of claim 1, wherein each helical seal of the two or more helical seals extends from the outer surface of the drive shaft to an outermost edge.

9. The compressor of claim 1, further comprising a housing configured to retain the first compressor wheel, the second compressor wheel, and the drive shaft, wherein the housing defines a channel sized to retain the drive shaft, and wherein a distance between the outermost edge of each helical seal and an inner surface of the channel is up to 0.05 millimeters (mm).

10. The compressor of claim 1, wherein for each helical seal of the two or more helical seals, a first set of one or more parameters defining the helical seal are substantially similar to a second set of one or more parameters defining another helical seal of the two or more helical seals, and wherein each of the first set of one or more parameters and the second set of one or more parameters comprises one or more of:
a pitch of the helical seal;
a helical angle of the helical seal;
a number of revolutions around the circumference of the drive shaft;
a longitudinal length of the helical seal; or
an outer diameter of the helical seal.

11. The compressor of claim 10, wherein each helical seal of the two or more helical seals defines a same number of revolutions around the circumference of the drive shaft.

12. A compressor system comprising:
a compressor comprising:
a first compressor wheel;
a second compressor wheel;
a drive shaft extending along a longitudinal axis from a proximal end to a distal end, the drive shaft comprising:
an outer shaft extending from the first compressor wheel to the second compressor wheel; and
an inner shaft disposed radially inwards of the outer shaft and extending through the first compressor wheel and the second compressor wheel,
wherein the drive shaft connects the first compressor wheel to the second compressor wheel, and wherein the distal end of the drive shaft is distal to the first compressor wheel; and
two or more helical seals disposed on the outer shaft of the drive shaft, each helical seal of the two or more helical seals extending away from an outer surface of the outer shaft and around a circumference of the outer shaft, wherein an outer diameter of each helical seal of the two or more helical seals is greater than an outer diameter of the outer shaft;
a housing configured to retain the compressor, the housing comprising:
a channel extending along the longitudinal axis and configured to retain the drive shaft, wherein the two or more helical seals are configured to inhibit flow of fluid between the first compressor wheel and the second compressor wheel through the channel; and
a motor coupled to the proximal end of the drive shaft and configured to apply a rotary force on the drive shaft.

13. The compressor system of claim 12, wherein the two or more seals comprise a first helical seal adjacent to the first compressor wheel and a second helical seal adjacent to the second compressor wheel.

14. The compressor system of claim 13, wherein the housing comprises one or more channels fluidically connecting the first compressor wheel to the second compressor wheel, wherein rotation of the drive shaft in a first direction causes the first compressor wheel to direct the fluid along the one or more channels and into the second compressor wheel.

15. The compressor system of claim 14, wherein the first helical seal is wound in the first direction, and wherein the second helical seal is wound in a second direction opposite the first direction.

16. The compressor system of claim 13, wherein the first helical seal is configured to direct fluid entering a distal end of the channel towards the first compressor wheel, and wherein the second helical seal is configured to direct fluid entering a proximal end of the channel towards the second compressor wheel.

17. The compressor system of claim 12, wherein the two or more helical seals are integrated into the drive shaft.

18. A method comprising:
position a first compressor wheel of a compressor within a housing;
connecting a second compressor wheel of the compressor to the first compressor wheel by at least partially inserting an outer shaft of a drive shaft of the compressor into the first compressor wheel, wherein the outer shaft is connected to the second compressor wheel, and wherein the outer shaft of the drive shaft comprises:
two or more helical seals disposed on the outer shaft, each helical seal of the two or more helical seals extending away from an outer surface of the outer shaft and around a circumference of the outer shaft;
inserting an inner shaft of the drive shaft through an inner lumen of the outer shaft along a longitudinal axis of the compressor; and
affixing the inner shaft to the first compressor wheel and the second compressor wheel.

19. The method of claim 18, wherein the housing defines an inner channel extending along the longitudinal axis from a proximal end to a distal end, and wherein inserting the outer shaft into the first compressor wheel comprises:
inserting the outer shaft into the proximal end of the inner channel;
advancing the outer shaft along the longitudinal axis until a distal end of the outer shaft extends past the distal end of the inner channel; and
affixing the distal end of the outer shaft to the first compressor wheel, wherein when the outer shaft is affixed to the first compressor wheel, the two or more helical seals are positioned within the inner channel.

20. The compressor of claim 1, wherein at least a portion of the second compressor wheel forms the outer shaft of the drive shaft.

* * * * *